(No Model.) 2 Sheets—Sheet 2.

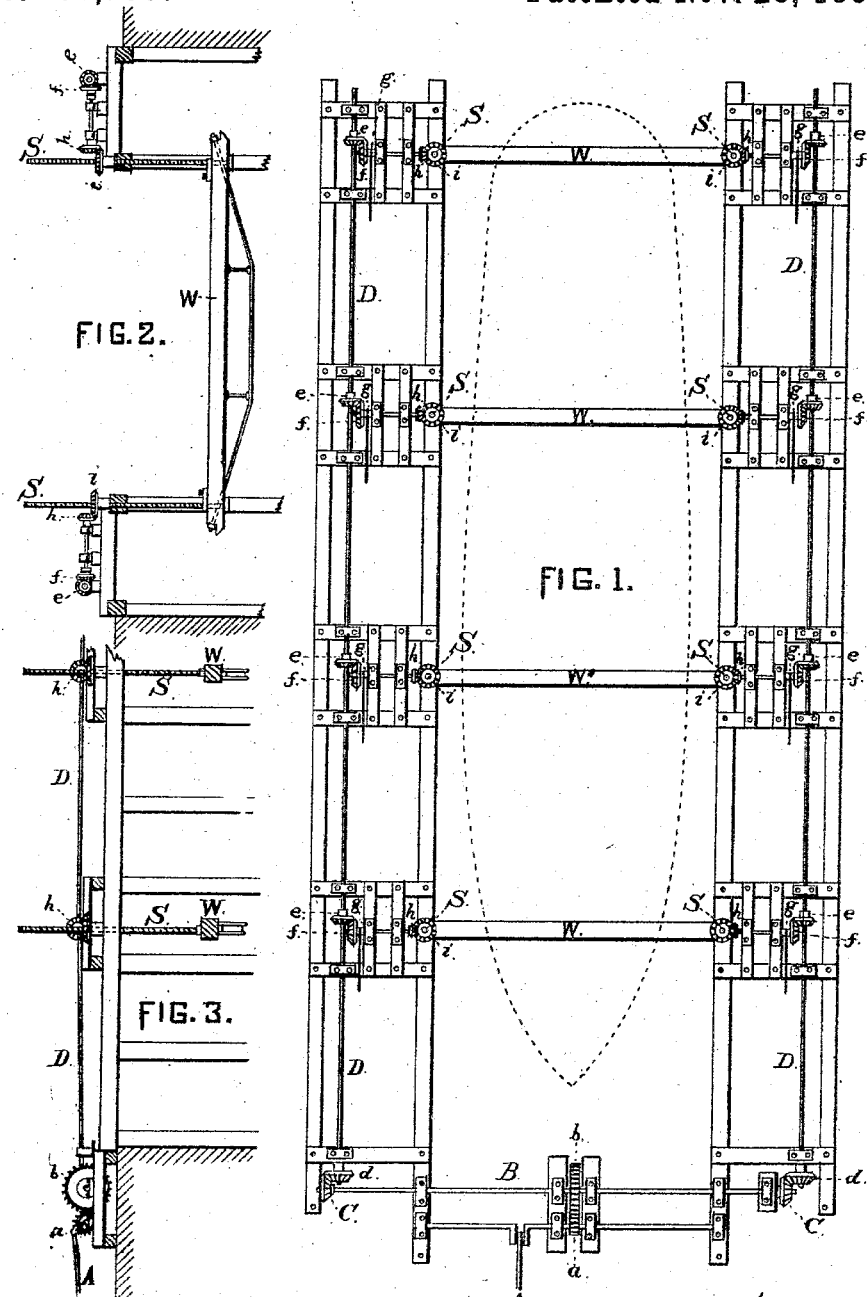

M. BOWE.
SCREW DOCK.

No. 268,177. Patented Nov. 28, 1882.

WITNESSES:
B. A. Hayes
Noah H. Swayne Jr.

INVENTOR:
Moses Bowe
By Shumon Hall
His Atty.

UNITED STATES PATENT OFFICE.

MOSES BOWE, OF TOLEDO, OHIO, ASSIGNOR OF ONE-HALF TO ALEX. WEBER, OF SAME PLACE.

SCREW-DOCK.

SPECIFICATION forming part of Letters Patent No. 268,177, dated November 28, 1882.

Application filed May 29, 1882. (No model.)

*To all whom it may concern:*

Be it known that I, MOSES BOWE, of Toledo, Lucas county, Ohio, have invented certain new and useful Improvements in Screw-Docks, of which the following is a specification.

My invention relates to the arrangement and manner of construction of docks and the various parts thereof, designed to lift vessels out of water by means of screws; and the objects of my invention are, first, by means of the mechanism herein described, to provide simple means of turning any or all of the screws of the dock, either together at a uniform rate of speed or independently of each other, so that the different timbers upon which the vessel rests may be separately raised and adjusted so as to conform to the line of the keel, thus avoiding undue strain upon the vessel, and so that the stem or stern of a vessel may be raised at the entrance to the dock without raising the whole vessel out of water, and so that at the same time two or more smaller vessels or boats may be held in such dock without its being necessary to raise or lower them all at once; second, to arrange all gearing and working parts so that they may be above water and easily accessible; and, third, to provide the hoisting-screws of the dock with nuts, pinions, and plates of peculiar form herein described, designed to obviate the necessity for bolts, pins, screws, or rivets in connecting such parts together, and to facilitate quick removals and repairs in case of breakage. I attain these objects by the mechanism illustrated in the accompanying drawings, which are made part of this specification, in which—

Figure 4:
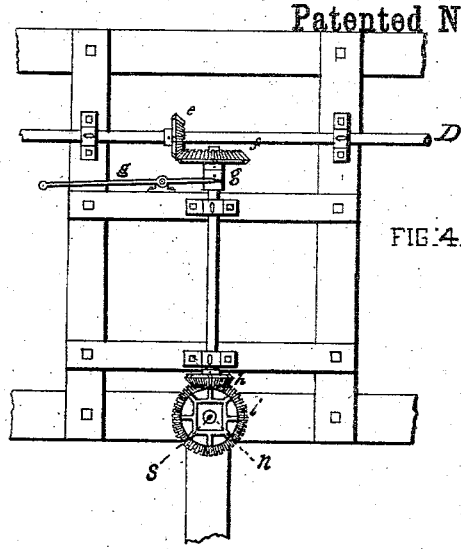
Figure 6:
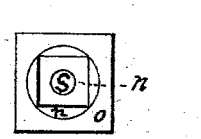
Figure 5:
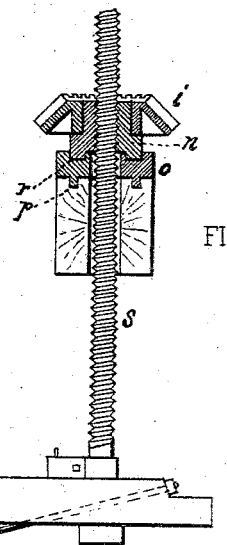

Figure 1 is a plan of the dock. Fig. 2 is a cross-section of the same between two pairs of screws. Fig. 3 is a central longitudinal vertical section of a portion of the same. Fig. 4 is an enlarged plan of the mechanism immediately connected with the hoisting-screws. Fig. 5 is a vertical section, in detail, of one of the hoisting-screws, its nut, the pinion which revolves the nut, and the plate upon which the nut rests; and Fig. 6 is a plan of said nut and plate.

Similar letters refer to similar parts throughout the several views and throughout the device.

Upon either side of the dock are driven two rows of piles, upon the tops of which are fixed the frames supporting the shafting, pinions, screws, clutches, &c. Motion is communicated to the machinery of the dock from a steam-engine by connection A, which revolves a shaft, upon which is fixed pinion $a$, which engages pinion $b$, upon the shaft B of which are pinions C, which communicate motion to the shafts extending along each side of the dock, upon which shafts are fixed pinions $d$ and $e$. The length of these shafts and the number of pinions $e$ will depend upon the length and weight of the vessels which the dock is designed to handle. Pinions $e$ transmit motion to pinions $f$. Pinion $e$ is fixed to its shaft D. Pinion $f$ slides longitudinally upon its shaft, but rotates with it, the shaft being provided with a fast feather which engages a slot in the eye of the pinion. By means of lever $g$ pinion $f$ is slipped to and fro on its shaft and thrown in and out of gear with pinion $e$ at will, so that any one or more of the screws S may readily be set in motion or stopped; but obviously this particular form of clutch is not essential, as other forms will readily suggest themselves. When in gear, pinions $f$ rotate pinions $h$ upon the other end of the same shaft, and the pinions $h$ engage and communicate motion to the horizontal beveled pinions $i$. Pinion $i$ has in its center a square opening, as shown in Fig. 4, which opening receives and fits the square top or head of nut $n$. I do not, however, limit my invention in this particular to a square opening or to a square-headed nut, as almost any other form, except round, would subserve my purpose, though not so well. Nut $n$ is provided with a shoulder, upon which rests pinion $i$. The nut $n$, below the part which enters pinion $i$, is circular and disk-like, and has projecting from its bottom, around the outer edge, a rim or ring, which sets into a corresponding circular channel, groove, or seat in the top of $o$, which is a square plate resting upon a timber of the frame of the dock. The pinion $i$ carries with it in its revolutions the nut $n$, which, resting upon plate $o$, and being kept in position by the ring and groove described, turns upon the thread of screw $s$ and lifts or lowers the same, as hereinafter described. The plate $o$ is provided with projections $p$ at bottom, which fit into holes in the timber thus holding the plate o stationary. In practice the tops of nut n and plate o are dished somewhat, so as to serve as a cup for lubricating-oil. s is a hoisting-screw passing through and fitting nut n, and having suspended from its lower end the trussed cross-piece w, which extends from screw to screw across the width of the machine, and upon which vessels rest when lifted in the dock.

The operation of the device is obvious. The cross-pieces w being lowered to a sufficient depth beneath the water, the vessel to be raised is floated into the dock. Upon the engine being set in motion pinions a, b, c, d, e, f, h, and i and nuts n are all caused to revolve at the same rate of speed, drawing the screws s upward through nuts n and raising with the screws their suspended burden of cross-pieces and vessel. At the beginning of the operation, as soon as a cross-piece touches the keel of the vessel its motion is stopped by throwing its screws out of gear by means of the clutches e f g until all the cross-pieces are caused to touch in the same manner, so as to conform to and fit the shape of the keel, when all of the screws are set in motion and the vessel is raised without undue strain upon her at any point. In this operation a severe strain falls upon pieces i n o, and breakages of these parts are likely to occur. In such case the form and arrangement of these parts are such that the removal and renewal of the broken part is the work of but a moment.

What I claim as my invention, and desire to secure by Letters Patent, is—

1. In a screw-dock, the combination and the arrangement of pinions a b c d e f h i, together with their shafts, the clutches e f g, nuts n, plates o, screws s, and cross-pieces w, substantially as shown and described, for the purposes specified.

2. The combination of the horizontal pinion i, provided with a square or polygonal opening designed to receive the head of nut n, the nut n, having a square or polygonal head, and provided with an annular rib, r, on its under side, and plate o, provided with annular groove designed to receive rib r, plate o being also provided at bottom with projections p, substantially as shown and described, for the purposes set forth.

3. The combination of pinion i, nut n, plate o, and screw s, substantially as shown and described, for the purposes set forth.

4. The combination of clutch e f g with pinions h and i, nut n, plate o, and screw s, substantially as shown and described, for the purposes specified.

MOSES BOWE.

Witnesses:
B. A. HAYES,
NOAH N. SWAYNE, Jr.